2,864,733

ZINC-TIN SOLDER FOR ALUMINUM

Frederick J. Kranich, Chicago, Ill.

No Drawing. Application June 28, 1955
Serial No. 518,650

10 Claims. (Cl. 148—24)

This invention relates to a solder alloy for joining metals and more particularly to a solder for uniting aluminum to aluminum or a dissimilar metal.

A principal object of the invention is to provide a solder which wets and flows well without flux, which exhibits high tensile strength and resistance to corrosion.

Another object of the invention is to provide a solder which is characterized by the absence of lead and which is capable of adhering to a surface prepared only by a mild abrasive.

Another object of the invention is to devise a metal alloy for making a solder capable of effectively uniting aluminum articles and forming practically a chemical bond therebetween.

Other and further objects, advantages and features of the present invention will be apparent to those skilled in the art from the following description.

The solder alloy of the present invention is comprised of tin and zinc, in almost equal quantities, a silicon-copper alloy prepared as described hereafter, and a small quantity of silver. The particular quantity of zinc and tin may be varied about four percent of the total weight of these elements, or within the ratio of nine to eleven for these two ingredients, to vary the characteristics of the finished product as desired. For instance, if a harder solder is desired the amount of zinc is increased and the amount of tin is decreased. The reverse is true if a softer solder is required.

The following are suggested or preferred quantity ranges of the ingredients employed to produce the improved solder, expressed as percentages of the total batch or melt by weight:

|  | Preferred Formula | Minimum | Maximum |
| --- | --- | --- | --- |
| Tin | 50.0 | 48.5 | 51.5 |
| Zinc | 46.75 | 45.35 | 48.15 |
| Silicon | 0.6375 | 0.60 | 0.66 |
| Copper | 2.55 | 2.45 | 2.65 |
| Silver | 0.0625 | 0.06 | 0.09 |

Example

For compounding fifty pounds of solder made in accordance with the present invention the following ingredients are desired:

25 pounds of tin
23 pounds, 6 ounces of zinc
25½ ounces of silicon-copper alloy
½ ounce of silver The silicon-copper alloy is preferably laboratory prepared in advance and contains approximately twenty percent of pure silicon and eighty percent pure copper. According to the present invention the quantities of silicon and copper are somewhat critical, while the above cited quantities for the other ingredients are merely preferred. The addition of too much copper renders the final solder product too brittle and hard for effective use, while too little copper or silicon prevents proper fusion of the product with the metal being soldered. The maximum amount of silicon in the final solder product appears to be limited by the holding capacity of the other ingredients for the silicon and the quantity range of silicon prescribed above for the ingredients to be alloyed has been found to be satisfactory to produce an end product having the desired characteristics.

Silicon-copper alloy in the amount of twenty-five and one-half ounces thus formulated is placed in a preheated carbon crucible along with a half ounce of silver. The contents are then heated to a fusion temperature in the neighborhood of 1800° F. This temperature, it will be understood, is the optimum temperature for carrying out the fusion of these materials and it is preferred that this temperature does not vary more than 100° F. in either direction. After the silicon-copper alloy and silver is fused, the contents of the crucible are permitted to cool in the fusion furnace to approximately 1400° F. at which temperature the twenty-three pounds six ounces of zinc is added. As quickly as possible after adding the zinc twenty-five pounds of tin is added. Both the zinc and the tin are first preheated almost to the melting point so that the silicon-copper alloy is not unduly chilled when the zinc and tin are added.

The resulting mixture is then stirred and permitted to cool slowly to about 1300° F. Desirably this cooling off occurs within the fusion furnace.

After the contents reach the temperature of 1300° F. the crucible is withdrawn from the furnace. This temperature may vary somewhat but, in any event, should not vary more than 100° F. either way. A small quantity, for example two or three ounces, of sulphur in rock form, or other commercial deoxidizer, is then stirred into the alloy with a carbon rod for the purpose of degasification and deoxidization. The alloy is then ready for pouring. A pouring temperature in the neighborhood of 1250° F. is preferred where the alloy is to be poured in the form of large slugs or billets. However, in any case, it is preferred, to keep the holding time before pouring as short as practicable in order to minimize any loss of the silicon due to its floating to the top of the melt, and to maintain the silicon distribution throughout the poured product as uniform as possible.

While it is preferred to vary the quantity of zinc and tin only about four percent to formulate a mixture of these elements for the present purpose, the variation may be considerably more and the mixture will be operative. The addition of silver to the mixture provides a homogeneous flow, increases the density of the product, and also insures a color consonant with aluminum or the other "white" metals. The quantity of silver is not critical as long as it is below 0.1 percent, otherwise the solder is rendered too hard.

In the solder of the present invention the silicon-copper alloy in the prescribed amount has been found to render the fusion metal more efficient and effective for the stated purpose. The silicon is especially advantageous in that it creates a better bond with aluminum, particularly in the commercial grades where silicon is very often present. All of the elements in the solder form an intimate atomic alliance with aluminum; and no flux is needed to use the solder of the present invention on aluminum. It is necessary merely to wire-brush the surface and that the surface be free of grease, liquids or dirt before applying the solder. With the addition of a suitable flux stainless steel may also be united with this solder.

For best results with my new solder an electric iron of a rating of three-hundred watts or more may be used. The iron should be at a temperature of 700–800° F. In addition, fusion may also be effected by the use of a pure gas in which helium and oxygen are embodied.

Although but one specific example for compounding my solder invention has been herein described it will be understood that details of the composition and of the compounding procedure set forth may be altered without departing from the spirit of this invention as defined by the following claims.

I claim:

1. A solder consisting essentially of zinc and tin in proportions within the ratio range of nine parts by weight of one and eleven parts by weight of the other, and less than one part by weight of an alloy consisting of approximately twenty percent by weight of silicon and approximately eighty percent by weight of copper.

2. A solder consisting essentially of zinc and tin in proportion within the ratio range of nine parts by weight of one and eleven parts by weight of the other; and less than one part by weight of an alloy consisting of silicon, copper and silver, the silicon being in an amount approximating twenty percent by weight of said one part of alloy.

3. A solder consisting essentially of zinc and tin within the ratio range of nine parts by weight of one and eleven parts by weight of the other; less than one part by weight of an alloy consisting of silicon and copper in which the amount of silicon is approximately one-fourth the amount of copper; and silver in an amount to provide a silver content in the solder not greater than 0.09 percent by weight of the total solder constituents.

4. A solder alloy consisting essentially of tin; zinc; silicon in a quantity that is not more than 0.66 percent of the total weight of the solder ingredients; and copper in a quantity that is not more than 2.65 percent of the total weight of the solder ingredients.

5. A solder alloy consisting essentially of tin and zinc in quantities within the ratio range of nine parts by weight of one to eleven parts by weight of the other; silicon in a quantity that is not more than 0.66 percent of the total weight of the solder ingredients; and copper in a quantity that is not more than 2.65 percent of the total weight of the solder ingredients.

6. A solder consisting essentially of approximately fifty percent tin by total weight; approximately 46.75 percent zinc by total weight; and the balance a silicon-copper alloy of which approximately twenty percent of the alloy weight is silicon and eighty percent of the alloy weight is copper.

7. A solder alloy consisting essentially of tin; zinc; silicon in a quantity that is not more than 0.66 percent of the total weight of the ingredients; copper in a quantity that is not more than 2.65 percent of the total weight of the ingredients; and a quantity of silver less than 0.1 percent of the total weight of the ingredients.

8. As a solder, an alloy of ingredients consisting essentially of tin in an amount within the range of 48.5 to 51.5 percent of the total ingredient weight, zinc in the amount within the range of 45.35 to 48.15 percent of the total ingredient weight, silicon within the range of 0.60 to 0 66 percent of the total ingredient weight, and copper in an amount within a range of 2.45 to 2.65 percent of the total ingredient weight.

9. As a solder, an alloy of ingredients consisting essentially of tin; zinc; silicon in a quantity approximately 0.6375 percent of the total weight of ingredients; copper in a quantity approximately 2.55 percent of the total weight of ingredients; and silver in an amount less than one percent of the total weight of ingredients.

10. As a solder, an alloy of ingredients consisting essentially of tin in an amount within a preferred range 48.5 to 51.5 percent of the total weight of ingredients, zinc in an amount within a preferred range of 45.35 to 48.15 percent of the total weight of ingredients, silicon in an amount in a preferred range of 0.60 to 0.66 of the total weight of ingredients, copper in an amount within a preferred range of 2.45 to 2.65 percent of the total weight of ingredients, and silver in an amount within a preferred range of 0.06 to 0.09 percent of the total weight of ingredients.

References Cited in the file of this patent

UNITED STATES PATENTS

| | | |
|---|---|---|
| 1,947,938 | Hey | Feb. 20, 1934 |
| 2,279,284 | Wassermann | Apr. 7, 1942 |

OTHER REFERENCES

Jour. of the Institute of Metals, vol. X, No. 2, pages 235–274, 1913.

Jour. of the Institute of Metals, vol. XIV, No. 2, pp. 178–188, 1915.

Hackh's Chemical Dictionary, 3rd ed., 1944, pages 34, 218.

Metals Handbook, 1948 ed., American Society for Metals, pages 1203–1204 relied on.

Metallurgical Dictionary, Henderson and Bates, 1953, pages 11, 81, 83.